United States Patent Office 3,467,279
Patented Sept. 16, 1969

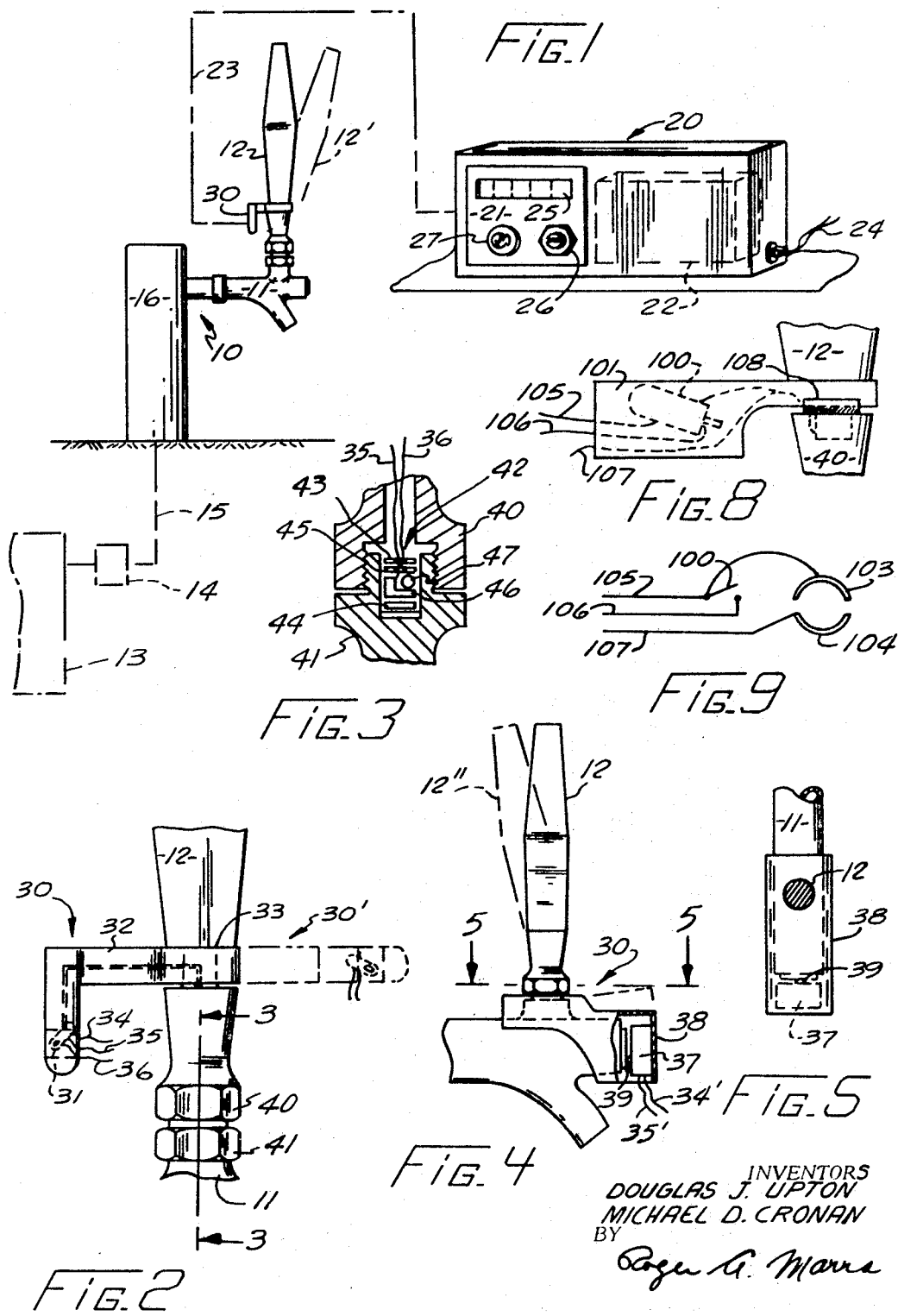

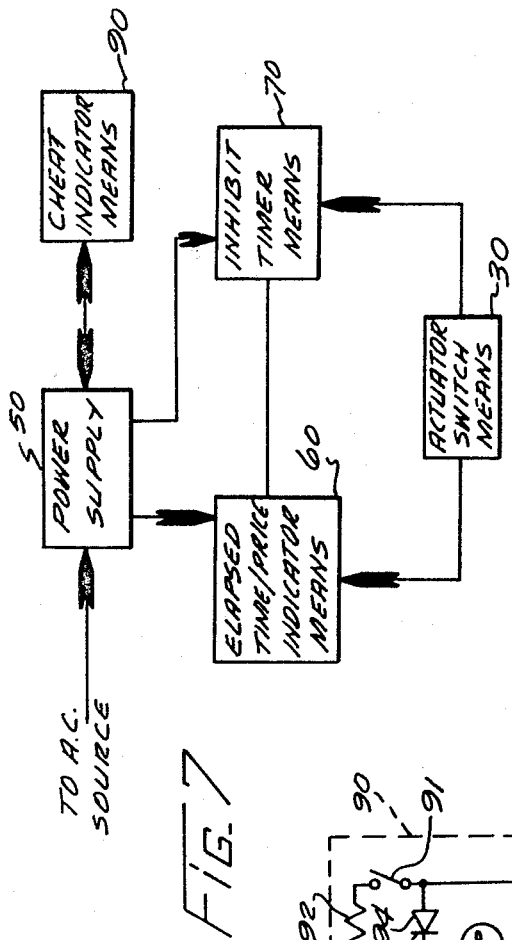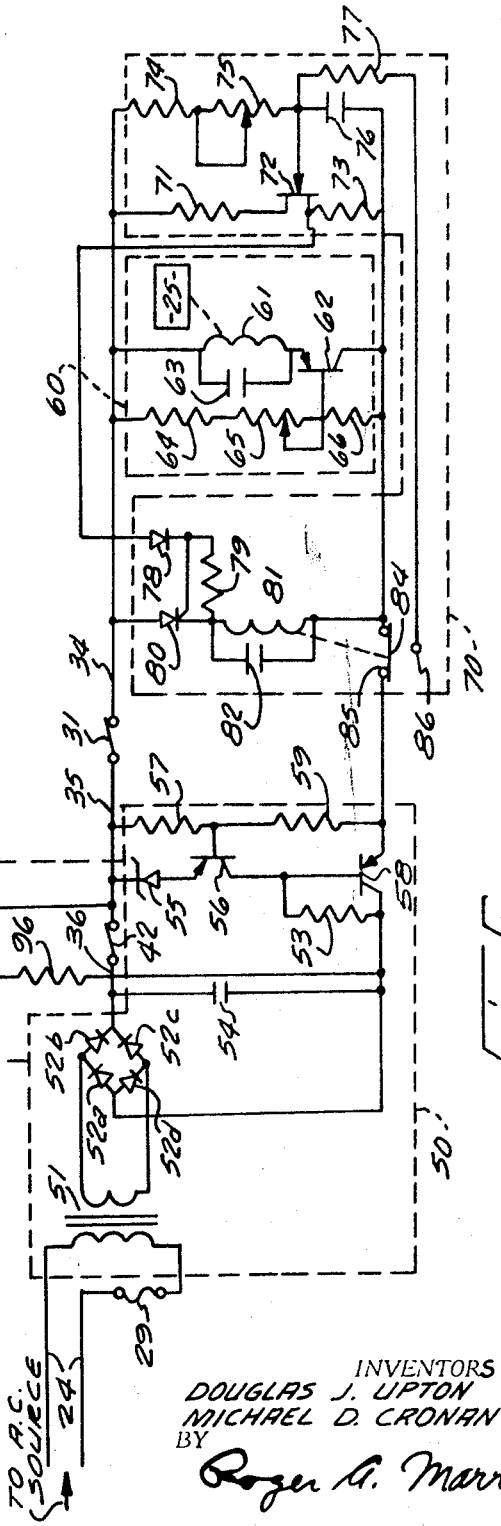

3,467,279
FLUID DISPENSING MONITOR
Douglas J. Upton and Michael D. Cronan, Los Angeles, Calif., assignors, by mesne assignments, to Douglas J. Upton, Northridge, Calif.
Filed Feb. 27, 1967, Ser. No. 618,958
Int. Cl. B67d 5/22, 5/08
U.S. Cl. 222—31                                15 Claims

ABSTRACT OF THE DISCLOSURE

A fluid dispensing monitor is described for providing an indication of the equivalent monetary value of a dispensed volume of fluid, such as beer. The monitor uses a constant speed motor to advance a counter calibrated in monetary units. The motor is activated by an actuator switch which is closed when a spigot is opened to dispense fluid. Inhibit timer means, also activated by the actuator switch, deenergizes the motor if the spigot remains open for longer than a preselected elapsed time. The motor remains deenergized for a duration corresponding to the difference between the time required to dispense a pitcher of beer and the time required to dispense by the glass a correspondingly priced volume of beer.

BACKGROUND OF THE INVENTION

Field of the invention

This invention relates to a fluid dispensing monitor, and more particularly, to an apparatus for indicating the equivalent monetary value of a volume of liquid dispensed through a valve. The monitor provides an accurate tally even though the liquid may be dispensed in containers of different size and different price per unit volume.

Description of the prior art

In taverns, kegged beer conventionally is dispensed through a hand operated valve or spigot into containers of various sizes. For example, beer commonly is sold in glasses of about 10 ounce capacity, and pitchers of about 48 ounce capacity. Often, the sale price of a pitcher is less than the sales price of a corresponding volume of beer dispensed in individual glasses.

A common problem experienced by tavern owners is that of monitoring the volume of beer dispensed in a period of time. Substantial losses may be incurred because of the inability of the tavern owner to check cash receipts with the volume of beer dispensed. For example, bartenders have been known to dispense larger volumes of beer while reporting sales of smaller amounts. Further, waiters may withhold a portion of cash paid by table customers, or may report sales of pitchers having a lower price per unit volume, as compared with glasses.

Thus, there exists a need for providing a monitoring device for tallying the volume of beer dispensed from a spigot and for providing the tavern owner with an accurate indication of the equivalent monetary value of the liquid dispensed.

In the past, attempts to control and record the volume of fluid dispensed have included the use of solenoid-operated valves actuated by a timer which is started by manually depressing one of a group of buttons located near the valve. When the button is pushed, beer flows through the valve for a fixed period of time, at the end of which the valve automatically is closed and the transaction counted. The system has numerous disadvantages, including that it cannot easily be added to existing beer dispensing systems, and that small additional quantities of fluid cannot be added, e.g., to compensate for foam. Further, both customers and bartenders are acutely aware of the system's presence.

An alternate system typified by the U.S. Letters Patent No. 3,252,654, provides a mechanical tongue for stopping flow from a spigot. To dispense the liquid, a glass is placed in a receptacle mounted on a swinging arm and the arm is swung into place under the spigot. Movement of the arm removes the tongue from the spigot and advances a mechanical counter which tallies the number of units sold. This system also suffers the disadvantages of requiring a cumbersome mechanical apparatus, and is susceptible to tampering.

Another approach is to provide a switching mechanism, controlled by the pressure of the fluid being dispensed, to operate a counter. However, fluid pressure switches are difficult to install within the fluid flow system, and are difficult to clean.

A more acceptable approach is to actuate sequentially a plurality of digital counters by a timing motor started by a switch mounted on the dispensing valve. This approach is typified by U.S. Letters Patent No. 3,195,774, wherein a counter actuating member, driven by the motor, is spring returned to a rest position each time the dispensing spigot is closed. This device has the advantage of not requiring substantial modification to existing beer dispensing mechanisms, but suffers the disadvantages of being mechanically complex, and of not providing a direct monetary readout. Rather, the device provides a total count of the number of glasses and pitchers dispensed, and a separate count of the number of pitchers dispensed. To obtain the equivalent monetary value, the tavern owner must subtract the two counts to determine the number of glasses sold, independently multiply the number of glasses and the number of pitchers by their respective prices, and add together the products. Even then the tally may be incorrect, as the device will not accurately count glasses or pitchers dispensed consecutively without closing the valve.

Moreover, none of the foregoing systems provides a positive indication that an attempt has been made to tamper with the operation of the system.

The fluid dispensing monitor which forms the subject matter of the present invention overcomes the disadvantages of the prior art mechanisms by providing a direct indication of the equivalent monetary value of a volume of fluid dispensed through a valve. An accurate tally is provided even though the fluid may be dispensed in glasses and pitchers having different prices per unit volume, and even though consecutive glasses or pitchers may be dispensed without closing the spigot. The system is actuated by a switch which is easily installed on the handle of the dispensing spigot, and being primarily electronic, utilizes a minimum of mechanical components. Further, a cheat switch, inconspicuously mounted in the spigot handle, actuates a lamp which provides a visual indication that an attempt has been made to tamper with the system.

SUMMARY OF THE INVENTION

The inventive fluid dispensing monitor utilizes an actuator switch mounted on the handle of a fluid dispensing apparatus in such a manner that when the handle is moved to open the associated spigot, the actuator switch is closed. The actuator switch energizes a constant speed motor which advances a counter calibrated in monetary units. The speed of the motor is adjusted so that if the spigot is open for the elapsed time necessary to pour a glass of beer, the counter will advance by an amount corresponding to the sale price of the glass.

The actuator switch also initiates operation of an inhibit timer means. If the spigot is kept open sufficiently long to dispense a pitcher of beer, the inhibit timer means will deactivate the motor driving the counter when the counter has tallied an amount corresponding to the pitcher price. The motor then is reactivated at the end of the time duration necessary to fill the pitcher. In this manner, an accurate tally of the equivalent monetary value of the volume of beer dispensed is provided, even though the beer is sold in containers having different prices per unit volume, and even though consecutive glasses or pitchers may be filled without the spigot being closed between dispensing of individual units.

Thus, a primary object of this invention is to provide an apparatus for monitoring the volume of fluid dispensed through a valve and for providing an indication of the equivalent monetary value of the dispensed liquid.

It is another object of this invention to provide a fluid dispensing monitor for indicating the equivalent monetary value of a volume of liquid dispensed in different sized containers having different prices per unit volume.

It is yet another object of this invention to provide a fluid dispensing monitor controlled by an actuator switch mounted on the handle of a liquid dispensing apparatus to activate an elapsed time/price indicator.

A further object of this invention is to provide a beer dispensing monitor including an elapsed time/price indicator which is activated by the opening of a spigot and which, when a pitcher is being dispensed, is subsequently deactivated for a duration corresponding to the difference in time required to dispense a pitcher and to dispense a correspondingly priced amount of beer in smaller glasses.

Another object of this invention is to provide a fluid dispensing monitor which will correctly tally the equivalent monetary value of glasses or pitchers of fluid dispensed consecutively without closing the spigot after each unit is filled.

Yet a further object of this invention is to provide a beer checking monitor including cheat indicator means for indicating that an attempt has been made to tamper with operation of the monitor.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a diagrammatic view of one embodiment of the inventive fluid dispensing monitor adapted to indicate the equivalent monetary value of a volume of beer dispensed by a typical dispensing apparatus;

FIGURE 2 is an enlarged fragmentary view illustrating a mercury switch embodiment of an actuator switch mounted on the handle of the typical beer dispensing apparatus illustrated in FIGURE 1;

FIGURE 3 is a sectional view of a typical anti-tamper switch mechanism as viewed generally along the line 3—3 of FIGURE 2;

FIGURE 4 is an elevation view, partially in section, of a microswitch actuator as installed on a typical beer dispensing spigot;

FIGURE 5 is a sectional view of the microswitch actuator as viewed generally along the line 5—5 of FIGURE 4;

FIGURE 6 is a schematic diagram of a typical circuit embodiment of the inventive fluid dispensing monitor illustrated in block diagram form in FIGURE 7;

FIGURE 7 is a block diagram of the inventive fluid dispensing monitor circuit; and FIGURES 8 and 9 are diagrammatic and schematic views of an alternate embodiment of a combined mercury switch and anti-tamper switch.

DESCRIPTION OF THE PREFERRED EMBODIMENT

Referring to FIGURE 1, there is shown a beer dispensing apparatus 10, such as is commonly used in taverns or other commercial establishments for serving beer in glasses or pitchers. Dispensing apparatus 10 typically comprises a spigot or valve 11, through which beer is dispensed when a handle 12 is moved from a closed position to an open position 12' (illustrated in phantom). The beer may be supplied from a keg 13 via pump 14 and tubing 15 (shown in phantom in FIGURE 1) to spigot 11, which spigot may be mounted on a support member 16.

The equivalent monetary value of a volume of beer dispensed by apparatus 10 may be monitored directly by the inventive fluid dispensing monitor, which in a typical embodiment may be packaged in housing 20. Housing 20 may be adapted to contain several monitors, and in the embodiment of FIGURE 1 is shown to house one monitor 21 and to provide space 22 for mounting an additional monitor. Each monitor facilitates measurement of the volume of beer dispensed by a single spigot.

Monitor housing 20, in a preferred embodiment, may be located remote from beer dispensing apparatus 10, as, for example, in an office some distance from the room in which spigot 11 is located. The only connection between dispensing apparatus 10 and its associated monitor 21 is a single three-conductor cable 23. Operation of monitor 21 is controlled by actuator switch means 30 mounted on handle 12 of dispensing apparatus 10. Monitor 21 receives AC power by means of line 24 which may be plugged into a common electrical outlet (not shown).

In operation, when handle 12 is moved to position 12', spigot 11 will be opened and beer will be dispensed at a generally uniform rate. Displacement of handle 12 to the open position actuates switch means 30, thus initiating operation of monitor 21. Counter 25 in monitor 21 may be calibrated in monetary units such as dollars and cents, and is driven by a constant speed motor (not shown in FIGURE 1), the speed of which may be controlled by means of screwdriver adjustment 26. The motor speed preferably is adjusted to advance counter 25 at a rate such that when spigot 11 is open for an elapsed time sufficient to fill a glass of particular size, counter 25 will advance by a monetary amount corresponding to the sale price of the glass of beer dispensed. Thus, for example, if beer is dispensed in 10 ounce glasses, each of which is sold for 20 cents, and if such a 10 ounce glass requires an average of five seconds to be filled, then the motor in monitor 21 preferably is adjusted to advance the indication on counter 25 by 20 cents in an elapsed time of five seconds.

When handle 12 is moved to open position 12' to open spigot 11, the motor in monitor 21 begins to advance counter 25. When handle 12 is closed subsequent to filling a glass, actuator switch means 30 will deenergize the motor driving counter 25, and the counter will stop advancing. Should a pitcher of beer be dispensed, monitor 21 will correctly tally this transaction, in a manner described in detail hereinbelow, even though the pitcher of beer may be sold at a lower price than the corresponding amount of beer dispensed in glasses.

Fluid dispensing monitor 21 further includes an anti-tamper or cheat indicator lamp 27, which gives a visual indication that an attempt has been made to tamper with the operation of the inventive fluid dispensing monitor.

Referring to FIGURE 2, there is shown a fragmentary view of the handle 12 and spigot 11 portions of beer dispensing apparatus 10 shown in FIGURE 1. Actuator switch means 30, in the embodiment shown, comprises a mercury switch 31 disposed within mounting bracket 32. Bracket 32 in a preferred embodiment includes an annular portion 33. To attach bracket 32 to handle 12, handle 12 is removed from spigot 11, as by disconnecting coupling members 40 and 41. Handle 12 then may be inserted through annular portion 33, and reattached to spigot 11.

In a preferred embodiment, mercury switch 31 is mounted at an appropriate angle to ensure that it will close (i.e., make electrical contact between conductors 34 and 35) when handle 12 is moved to open position 12' to dispense beer. Mercury switch 31 should maintain its OFF condition (i.e., no electrical contact between conductors 34 and 35) when handle 12 is positioned so that spigot 11 is closed. In an alternative embodiment, illustrated in phantom in FIGURE 2, actuator switch means 30' may be located on the opposite side of handle 12. Such an alternate mounting is desirable, for example, for dispensing equipments in which handle 12 is pushed away from the operator to initiate the flow of beer.

Coupling members 40 and 41, which are used to attach handle 12 to spigot 11, in a preferred embodiment, house a cheat switch 42 (illustrated most celarly in FIGURE 3). Should an attempt be made to remove actuator switch means 30, for example, by loosening coupling members 40 and 41 to remove handle 12, cheat switch 42 will be at least momentarily opened. This will result in a visual indication on lamp 27 (see FIGURE 1), which indication will remain until manually reset, even though coupling members 40 and 41 subsequently are sufficiently tightened to close cheat switch means 42.

In a typical embodiment, cheat switch means 42 may comprise insulative washers 43 and 44 and electrical contacts 45 and 46. When coupling member 40 is tightened against coupling member 41, electrical connection is made between contacts 45 and 46. Positive electrical contact is ensured by means of an electrically conductive ball 47 having a diameter slightly larger than that of contact 46. Electrical leads 35 and 36 extend from contacts 45 and 46 respectively and exit from dispensing apparatus 10 through the interiors of coupling member 40 and actuator switch mounting bracket 32. Wires 34, 35 and 36 may be combined in a single cable 23 for connection to monitor 21 (see FIGURE 1).

Referring now to FIGURES 4 and 5, there is shown an alternate embodiment of actuator switch means 30 employing microswitch 37. Microswitch 37 may be mounted in housing 38 in such a manner that, when handle 12 is in the closed position shown, microswitch tongue 39 bears against spigot 11 maintaining switch 37 in an open-circuit condition. When handle 12 is moved to its open position 12" (shown in phantom in FIGURE 4), microswitch tongue 39 will be removed from spigot 11, causing microswitch 37 to close, hence making electrical contact between conductors 34' and 35'.

A block diagram of the inventive fluid dispensing monitor is shown in FIGURE 7. The monitor comprises a power supply 50, which provides a regulated DC voltage for the various monitor circuits. A readout of the equivalent monetary value of the volume of fluid dispensed is provided by elapsed time/price indicator means 60 which in a preferred embodiment utilizes a constant speed motor to advance counter 25 (see FIGURE 1) at a constant rate. When beer is dispensed in glasses, the duration for which elapsed time/price indicator means 60 is operative is determined entirely by actuator switch means 30. Counter 25 is advanced continuously while spigot 11 is open to dispense a glass of beer; the rate at which counter 25 advances insures that counter 25 will tally the cost of a glass in the elapsed time required to fill the glass.

Actuator switch means 30 also initiates operation of inhibit timer means 70, which timer means recognizes by the elapsed time that spigot 11 is open and that a pitcher of beer is being dispensed. Inhibit timer means 70 functions to deactivate elapsed time/price indicator means 60 after switch means 30 has been actuated for a duration corresponding to the elapsed time required to advance counter 25 by an amount equal to the price of a pitcher of beer. Inhibit timer means 70 reactivates elapsed time/price indicator means 60 at a later time corresponding to completion of dispensing of the pitcher.

By way of example, if a pitcher of beer is dispensed, indicator means 60 and inhibit timer means 70 both will be activated by actuator means 30 when spigot 11 is opened. If the volume of beer in the pitcher equals the volume of five glasses of beer, but the pitcher price is equal to four glasses of beer, inhibit timer means 70 will deactivate elapsed time/price indicator means 60 when counter 25 has advanced by an amount equal to the cost of four glasses of beer (i.e., 20 seconds at 5 seconds per glass). Inhibit timer means 70 then will reactivate price indicator means 60 after the additional elapsed time required to pour the fifth bonus glass. In this manner, the total monetary value recorded by indicator means 60 will correctly reflect the dispensing of both glasses and pitchers.

Cheat indicator means 90 provides a visual indication that an attempt has been made to tamper with the operation of the fluid dispensing monitor. Cheat indicator means 90 indicates that either an attempt has been made to disconnect actuator switch means 30, or that the operation of the monitor has been interrupted by a period of time, as by pulling its plug from the AC socket. The resultant visual indication thus will warn the tavern owner that the value of dispensed beer indicated by counter 25 is erroneous.

Referring now to FIGURE 6, there is shown a schematic circuit diagram of a preferred embodiment of the inventive fluid dispensing monitor. As shown therein, power supply 50 may be connected to an AC source by means of cable 24. Fuse 29 protects the monitor from sudden overload. The AC input is stepped down to an appropriate voltage level by transformer 51. The AC voltage present at the output of transformer 51 is converted to DC by a full-wave bridge rectifier comprising diodes 52a, 52b, 52c and 52d, and is filtered by capacitor 54.

Voltage regulation in power supply 50 is provided by transistor 58, the emitter and collector of which are connected in series with one side of the DC line. The power supply output is applied across series resistors 57 and 59. The voltage at the junction of resistors 57 and 59 (which is indicative of the instantaneous magnitude of the power supply output voltage) is applied to the base of transistor 56. Zener diode 55 provides a fixed reference voltage at the emitter of transistor 56. The voltage at the collector of transistor 56 as developed across resistor 53, provides a control voltage at the base of transistor 58. This control voltage causes transistor 58 to increase or decrease conduction by an amount appropriate to compensate for changes in output voltage from the bridge rectifier. A regulated DC voltage thus is available to power the various other monitor circuits.

Elapsed time/price indicator means 60 comprises constant speed motor 61, transistor 62, capacitor 63 and resistors 64, 65 and 66. When actuator switch 31 is closed (for example, when spigot 11 of beer dispensing apparatus 10 is open), the regulated DC voltage from power supply 50 is supplied to motor 61 by way of transistor 62. The voltage applied to motor 61, and hence to its speed, is controlled by varying the voltage drop across the emitter and collector of transistor 62. This voltage drop is determined by the bias voltage on the base of transistor 62, which bias is supplied by the voltage divider network comprising resistors 64, 65 and 66. Thus, adjustment of resistor 65 controls the base voltage of transistor 62, and hence the speed of motor 61. Motor 61 is mechanically coupled to counter 25, hence variable resistor 65 corresponds to adjustment 26 shown in FIGURE 1. Capacitor 63 serves to limit voltage surges associated with the starting and stopping of motor 61.

In operation, resistor 65 is adjusted to ensure that motor 61 runs at a speed appropriate to advance counter 25 by an amount corresponding to the price of a glass of beer in an elapsed time equal to that required to dispense such a glass. Power will be disconnected from motor 61 by the opening of actuator switch 31 when handle 12 is brought to its closed position subsequent to filling the glass of beer. On the average, an accurate tally will be achieved even if the spigot is reopened for short additional periods to compensate for foam. Note, for example, that if two glasses of beer are dispensed consecutively without closing handle 12 therebetween, an accurate transaction record still will be achieved. Since power will be applied to motor 61 for the elapsed time required to pour two glasses, the indication on counter 25 correspondingly will advance by an amount equivalent to the price of two glasses.

A constant rate of advancement of counter 25 and hence, an accurate indication of the equivalent monetary value of the liquid dispensed, is ensured by the use of a regulated DC voltage to drive constant speed DC motor 61. In an alternate embodiment, not illustrated, motor 61 may be of the synchronous AC variety. An appropriate frequency control circuit, well known to those skilled in the art, then may be used to control the frequency of the voltage applied to the motor, and hence its speed.

Inhibit timer means 70 comprises capacitors 76 and 82, unijunction transistor 72, diode 78, silicon control rectifier 80, time delay relay 81 and resistors 71, 73, 74 ,75, 77 and 79.

When actuator switch 31 is closed (i.e., when handle 12 is opened to initiate the flow of beer), power is applied to inhibit timer means 70 (as well as elapsed time/price indicator means 60). Current thus flows through resistors 74 and 75 to charge capacitor 76 at a rate determined primarily by the values of resistors 74 and 75 and capacitor 76. The voltage at the junction of resistor 75 and capacitor 76 is applied to the gate of transistor 72.

When the charge on capacitor 76 becomes sufficiently large (i.e., when actuator switch 31 has been closed for a relatively long duration) transistor 72 will begin conduction, and current will flow through resistor 71, transistor 72 and resistor 73. As a result, the voltage at the junction between resistor 73 and the drain of transistor 72 will rise to a positive value. Current then will flow through the path comprising resistor 71, transistor 72, diode 78, resistor 79 and relay coil 81. The resultant positive voltage developed at the junction between diode 78 and resistor 79 will bias silicon controlled rectifier (SCR) 80 to its conduction state. As a result, relay coil 81 will be connected via SCR 80 directly across the full DC voltage from power supply 50. This will cause relay 81 to energize, disconnecting relay switch arm 84 from contact 85 and connecting it to contact 86, thus disconnecting the voltage from motor 61 and inhibiting advancement of counter 25.

When relay switch arm 84 connects with contact 86, a discharge path for capacitor 76 is provided via resistor 77. Capacitor 76 then will discharge, the gate voltage on transistor 72 will be removed, and transistor 72 will cease conduction. This in turn will cause the voltage at the junction of resistor 73 and diode 78 to drop, thus removing the gate voltage from SCR 80. The timer circuit then is conditioned for subsequent operation when another pitcher of beer is dispensed. Also note that a discharge path for capacitor 76 exists via resistors 74, 75, 64, 65 and 66. This path allows capacitor 76 to discharge between filling individual glasses so that relay 81 is not actuated subsequent to the separate filling of four glasses, but only when a pitcher is filled.

When the time delay relay is energized, the current through coil 81 is interrupted by the opening of switch arm 84 from contact 85. However, since relay 81 is of the RC delay variety, relay switch arm 84 does not return immediately to its normal position (i.e., touching contact 85). Rather, switch arm 84 will return at a somewhat later time, determined by the RC delay characteristics of the relay; this relay delay time may be adjusted electrically, if desired, by employing a trimmer resistor across the capacitor 82. Capacitor 82 serves to establish the relay OFF interval delay in conjunction with the resistance of the coil.

In operation, resistor 75 is adjusted so that the time required to charge capacitor 76 to a voltage sufficient to cause transistor 72 to start conducting corresponds to the elapsed time required to advance counter 25 by an amount corresponding to the price of a pitcher of beer. For example, if a pitcher holding five glasses of beer sells for the same price as four glasses, the time constant of resistors 74 and 75 and capacitor 76 is adjusted so that transistor 72 starts to conduct when handle 12 has been held open (i.e., actuator switch 31 has been closed) for an elapsed time required to pour four glasses. Similarly, the time delay of relay 81 is adjusted to maintain switch arm 84 away from contact 85 for a time duration equal to the difference between the time required to fill a pitcher and the time required to fill the number of glasses having a total cost equal to that of the pitcher. Thus, in our example, if a five-glass pitcher sold for a price equal to that of four glasses, time delay relay 81 is adjusted to remain open for a duration equal to the time required to pour one glass.

In an alternate embodiment, relay 81 may be of the thermal delay variety, and an additional circuit may be provided to deenergize relay 81 after the appropriate delay.

Cheat indicator means 90 comprises cheat switch 42, reset switch 91, resistors 92, 93 and 96, SCR 94 and indicator lamp 95 (corresponding to indicator 27 in FIGURE 1). Initially, indicator lamp 95 is turned ON by depressing momentary contact switch 91. This will cause current to flow in the path comprising resistors 92 and 93, lamp 95 and resistor 96. The voltage drop across resistor 92 will provide a sufficient voltage at the gate of SCR 94 to cause SCR 94 to conduct. When this occurs, sufficient voltage will appear across lamp 95 to turn it ON. Lamp 95 will remain ON, even after switch 91 is open, since once initiated, current will continue to flow through SCR 94 until the voltage is removed from its anode or cathode.

Should an attempt be made to tamper with actuator switch means 30, as by loosening coupling means 40 and 41 (see FIGURE 3), normally closed cheat switch contacts 45 and 46 will be disconnected, opening cheat switch 42. This will remove the DC voltage from SCR 94, thus causing cheat lamp 95 to go OFF. If coupling means 41 and 42 again are tightened together, closing switch 42, current will again be supplied to the fluid dispensing monitor and to indicator means 90. However, because reset switch 91 is open, no gate voltage will be supplied to SCR 94 and SCR 94 will not conduct. Cheat lamp 95 will remain OFF. In a similar manner, if cheat indicator lamp 95 has been turned ON by depressing rest switch 91, and an attempt is made to prevent the inventive fluid dispensing monitor from operating by removing power lead 24 from the AC line, indicator 95 again will be extinguished. In this respect, indicator lamp 95 plays a second function of indicating the occurrence of a power failure, which also would result in an erroneous tally on counter 25.

Another embodiment of a mercury switch apparatus and cheat switch is shown in FIGURES 8 and 9, wherein a mercury switch 100 is mounted in a housing 101 which includes a neck portion 102 that is held on the spigot between handle 12 and the upper surface of coupling member 40. The housing carries a pair of conductive segments 103 and 104 which are disposed between the neck portion 102 and the upper portion of coupling member 40 so that when the housing is mounted to the handle and coupling member, segments 103 and 104 are electrically connected through the material of coupling member 40. The combined mercury switch and cheat switch provide a three lead-wire system wherein leads 105 and 106 are concerned with the operation of the mercury switch 100 while leads 105 and 107 are concerned with the operation of the cheat switch. The pair of segments 103 and 104 are insulated from the neck portion 102, as well as from each other, by means of an insulative washer 108. The mercury switch and cheat switch operate in a manner similar to the embodiments previously described in that closure of the mercury switch effected by movement of the handle 12 will cause the counter apparatus to commence. In the event an attempt be made to remove the mercury switch housing 101 from the handle, electrical continuity between the segments 103 and 104 will be at least momentarily opened. This will result in a visual indication on the lamp 27.

It is to be understood that while the operation of the inventive fluid dispensing monitor has been described in terms of an application to the sale of beer, the invention is by no means thus limited. Rather, the fluid dispensing monitor may be employed to indicate the equivalent monetary value of any dispensed liquid.

While particular embodiments of the present invention have been shown and described, it will be obvious to those skilled in the art that changes and modifications may be made without departing from this invention in its broader aspects.

We claim:

1. A device for indicating the equivalent monetary value of a volume of liquid dispensed by an apparatus of the type including a spigot having open and closed positions said device comprising:
   a switch adapted to be actuated when said spigot is in its open position,
   a counter,
   motor means operatively connecting said switch and said counter for advancing said counter at a constant rate in response to the elapsed time said switch is actuated, and
   an electronic timer responsive to actuation of said switch for deactivating said motor means to inhibit further advancement of said counter if said switch is actuated for longer than a preseletced time duration.

2. A device as defined in claim 1, wherein said motor means comprises a constant speed motor.

3. A device as defined in claim 2 wherein said electronic timer means comprises:
   a capacitor charged via a resistor when said switch is actuated,
   a relay, the normally closed switch contact of said relay being connected in series with said motor, and
   means for actuating said relay when the charge on said capacitor reaches a threshold value.

4. A device as defined in the claim 3 further comprising:
   means for controlling the voltage applied to said motor, thereby adjusting said counter advancing rate; and
   wherein said resistor is variable, said variable resistor providing means for selecting said time duration.

5. A device as defined in claim 3 wherein said relay comprises a time delay relay, and wherein said means for actuating comprises a silicon controlled rectifier connected in series with the coil of said relay, and means for gating on said silicon controlled rectifier when said charge threshold value is reached.

6. An apparatus for indicating the equivalent monetary value of a volume of liquid dispensed through a valve controllable by a handle comprising, in combination:
   a switch,
   means for mounting said switch on said handle to actuate said switch when said handle is moved to open said valve,
   a counter,
   a motor for advancing said counter at a constant rate, said motor being connected to a source of power by actuation of said switch, and
   electronic timer means, connected to said source of power by actuation of said switch, for disconnecting said motor from said source of power after said switch has been actuated for a first preselected time duration, and for reconnecting said motor to said source of power after a second preselected time duration.

7. A device as defined in claim 6 wherein said electronic timer means comprises:
   a capacitor charged via a resistor when said switch is actuated and a transistor, the gate voltage of said transistor being derived from the charge on said capacitor, said transistor being gated ON when said charge reaches a threshold value, and
   a time delay relay operatively responsive to turn-on of said transistor for disconnecting said motor from said source of power for the period of time delay of said relay.

8. A device as defined in claim 7 wherein said electronic timer means further comprises a silicon controlled rectifier in series with the coil of said time delay relay, and wherein the gate voltage of said rectifier is provided by conduction of said transistor.

9. A device as defined in claim 8 further comprising:
   means for discharging said capacitor while said power is disconnected from said motor.

10. A device as defined in claim 9 further comprising:
    a regulated power supply for providing said source of power.

11. A device as defined in claim 10 wherein said motor utilizes DC power, and further comprising means for adjusting the voltage level supplied to said motor to control the speed thereof.

12. A device as defined in claim 10 wherein said motor comprises a synchronous AC motor, and further comprising means for adjusting the frequency of the power supplied to said motor to control the speed thereof.

13. A device as defined in claim 6 further including cheat indicator means comprising:
    a switch adapted for actuation when said handle and said valve are normally coupled; and
    indicator means responsive to deactuation of said cheat switch for providing a visual indication that said handle and said valve have been decoupled.

14. A device as defined in claim 13 wherein said switch is adapted for mounting within the coupling between said handle and said valve, said switch being open circuited when said handle and said valve are decoupled, and wherein said indicator means comprises:
    a lamp connected in series with a silicon controlled rectifier and said switch across said source of power; and
    means for providing a momentary voltage at the gate of said rectifier for initiating conduction of said rectifier.

15. A device as defined in claim 7 wherein the normally closed switch contacts of said relay are connected in series with said motor, wherein the RC time constant of said capacitor and said resistor determines said first time duration, and wherein said period of time delay of said relay determines said second time duration.

(References on following page)

References Cited

UNITED STATES PATENTS

| | | | |
|---|---|---|---|
| 2,018,538 | 10/1935 | Webb | 58—145 X |
| 2,474,843 | 7/1949 | Helsing | 194—9 X |
| 2,669,336 | 2/1954 | Hunsinger | 194—10 |
| 2,911,144 | 11/1959 | Lee et al. | 58—145 X |
| 3,195,774 | 7/1965 | Pipersky et al. | 235—94 X |
| 3,258,908 | 7/1966 | Fischer | 58—145 |
| 3,301,058 | 1/1967 | Roberts. | |
| 3,306,030 | 2/1967 | Wiley | 58—145 |

STANLEY H. TOLLBERG, Primary Examiner

U.S. Cl. X.R.

222—170